United States Patent
Saigusa et al.

(10) Patent No.: US 7,196,725 B1
(45) Date of Patent: Mar. 27, 2007

(54) IMAGE READING APPARATUS AND COMPUTER READABLE STORAGE MEDIUM

(75) Inventors: Akio Saigusa, Utsunomiya (JP); Hitoshi Inoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,872

(22) Filed: May 11, 1999

(30) Foreign Application Priority Data

May 12, 1998 (JP) .......................... 10-128862

(51) Int. Cl.
*H04N 5/217* (2006.01)
*H04N 9/64* (2006.01)

(52) U.S. Cl. .................. 348/245; 348/241; 348/243

(58) Field of Classification Search ........... 348/241, 348/243, 244, 245, 246, 250, 251, 294; 358/463, 358/527, 487; 378/98, 98.2, 98.3, 98.4, 98.5, 378/98.6, 98.7, 98.8, 98.9, 98.11, 98.12, 62
See application file for complete search history.

(56) References Cited

U.S. PATENT DOCUMENTS

| | | | | |
|---|---|---|---|---|
| 5,181,118 A | * | 1/1993 | Kimura | 348/243 |
| 5,355,164 A | * | 10/1994 | Shimoyama et al. | 348/243 |
| 5,376,966 A | | 12/1994 | Takase | 348/243 |
| 5,604,781 A | | 2/1997 | Suzuki et al. | 378/62 |
| 5,608,455 A | | 3/1997 | Oda | 348/245 |
| 5,751,451 A | * | 5/1998 | Ogoshi et al. | 358/527 |
| 5,778,044 A | * | 7/1998 | Bruijns | 378/98.7 |
| 5,940,125 A | * | 8/1999 | Suganuma | 348/243 |
| 6,219,405 B1 | * | 4/2001 | Inoue | 378/98.8 |
| 6,449,390 B1 | * | 9/2002 | Inoue | 382/168 |

FOREIGN PATENT DOCUMENTS

| | | |
|---|---|---|
| DE | 195 16 832 C1 | 11/1996 |
| EP | 0 660 596 A1 | 11/1994 |

* cited by examiner

*Primary Examiner*—Wendy R. Garber
*Assistant Examiner*—Justin Misleh
(74) *Attorney, Agent, or Firm*—Fitzpatrick, Cella, Harper & Scinto

(57) ABSTRACT

In an X-ray film image reading apparatus, dark output distribution data of a CCD line sensor is corrected by using correction data. In order to suppress the influence of random noises on the correction data, a dark distribution correction data calculation circuit 10 calculates an average value or mode value of dark distribution outputs of all or some pixels of a CCD line sensor or a dark distribution output of the CCD line sensor subjected to a spatial low-pass filtering process, and stores it in a dark distribution memory as correction data. Next, a light source is turned on, and a subtractor subtracts the stored correction data from an output of the line sensor read from an X-ray film while the light source is turned on.

12 Claims, 3 Drawing Sheets

IMAGE READING APPARATUS AND COMPUTER READABLE STORAGE MEDIUM

BACKGROUND OF THE INVENTION

1. Field of the Invention

The present invention relates to an image reading apparatus for optically reading an image and a computer readable storage medium which stores program codes for realizing the function of the image reading apparatus, in particular, to the apparatus and storage medium suitable for reading of an image of an X-ray film of medical use.

2. Related Background Art

Various types of image reading apparatuses have been developed recently. Also in the medical field, apparatuses have been developed which detect an image, particularly an image of an X-ray film of medical use and digitalize it for use such as electronic filing, remote diagnosis and automatic diagnosis.

With such an image reading apparatus, light from a light source such as a halogen lamp and a fluorescent lamp is applied to an X-ray film, and light transmitted through the X-ray film is received by a solid state image pickup device and converted into an electric signal which is then converted into a digital signal to be output to an image processing circuit for shading correction and the like. The image pickup device may be a CCD line sensor and the like.

A CCD line sensor which is used as the solid state image pickup device has a variation in pixel data, called a dark output distribution (fixed pattern noises) caused by dark current fluctuation or the like. As a two-dimensional image is scanned and read with a CCD line sensor, the dark output distribution fixed to respective pixels as different from random noises appears on the image as artifacts which linear in the scan direction. Since a medical X-ray film image reading apparatus outputs density values, such artifacts become conspicuous in a high density area. Therefore, if a CCD line sensor is used as the solid state image device, it is necessary to check fixed pattern noises at each pixel and correctly compensate for such noises.

In a know method of compensating for fixed pattern noises, an output of each pixel of a CCD line sensor when a light source is not turned on is stored in a memory or the like, and an offset value corresponding to the fixed pattern noises is subtracted from pixel data by a subtractor. In order to suppress the influence of random noises, an output of each pixel picked up without light may be collected a plurality of times to use an average of the plurality outputs as fixed pattern noise correction data.

With this method, however, if random noises are mixed with the fixed pattern noise correction data, an image is corrected by using the fixed pattern noise correction data containing random noise components, and these noises appear on the image as linear artifacts.

If fixed pattern noises are collected a plurality of times and these noises are averaged in order to suppress the influence of random noises, it takes a long time to collect data, memory means capable of storing data of a plurality of lines becomes necessary, and the circuit structure becomes complicated.

SUMMARY OF THE INVENTION

The invention has been made to solve the above problems and it is an object of the present invention to reduce the influence of random noises upon fixed pattern noise correction data to.thereby prevent artifacts from being superposed upon an image and execute a black correction process with simple circuits.

According to one aspect of the present invention, there is provided an image reading apparatus which comprises: image pickup means for optically reading an image and converting the read image into an electrical image signal; calculating means for calculating correction data in accordance with dark output distribution data obtained by the image pickup means; and subtracting means for subtracting the correction data from the image signal obtained by the image pickup means by reading the image.

According to another aspect of the present invention, there is provided a computer readable storage medium storing a program, the program executing: an image pickup step of optically reading an image with image pickup means and converting the read image into an electrical image signal; a calculating step of calculating correction data in accordance with dark output distribution data obtained by the image pickup means; and a subtracting step of subtracting the correction data from the image signal obtained by the image pickup means by reading the image.

DETAILED DESCRIPTION OF THE PREFERRED EMBODIMENTS

First, the principle upon which the present invention is based will be described.

With recent improvements on manufacture techniques of CCD line sensors, a variation in fixed pattern noises such as dark current fluctuation is becoming negligibly small. From this reason, in this invention, an average value or mode value (most frequently occurring value) of dark outputs of all or some pixels of a CCD line sensor or a dark output of the CCD line sensor subjected to a spatial low-pass filtering process is used for each pixel as correction data for fixed pattern noises such as dark current fluctuation.

Since an average value or mode value (most frequently occurring value) of dark outputs of all or some pixels of a CCD sensor or a dark output of the CCD sensor subjected to a spatial low-pass filtering process is used as correction data for fixed pattern noises such as dark current fluctuation, it is possible to prevent artifacts from appearing on an image by using simple circuits, which artifacts may be caused by random noises superposed upon the correction data.

Embodiments of the invention will be described with reference to the accompanying drawings.

An X-ray film image reading apparatus is used by way of example in the following embodiments.

Figure 1:
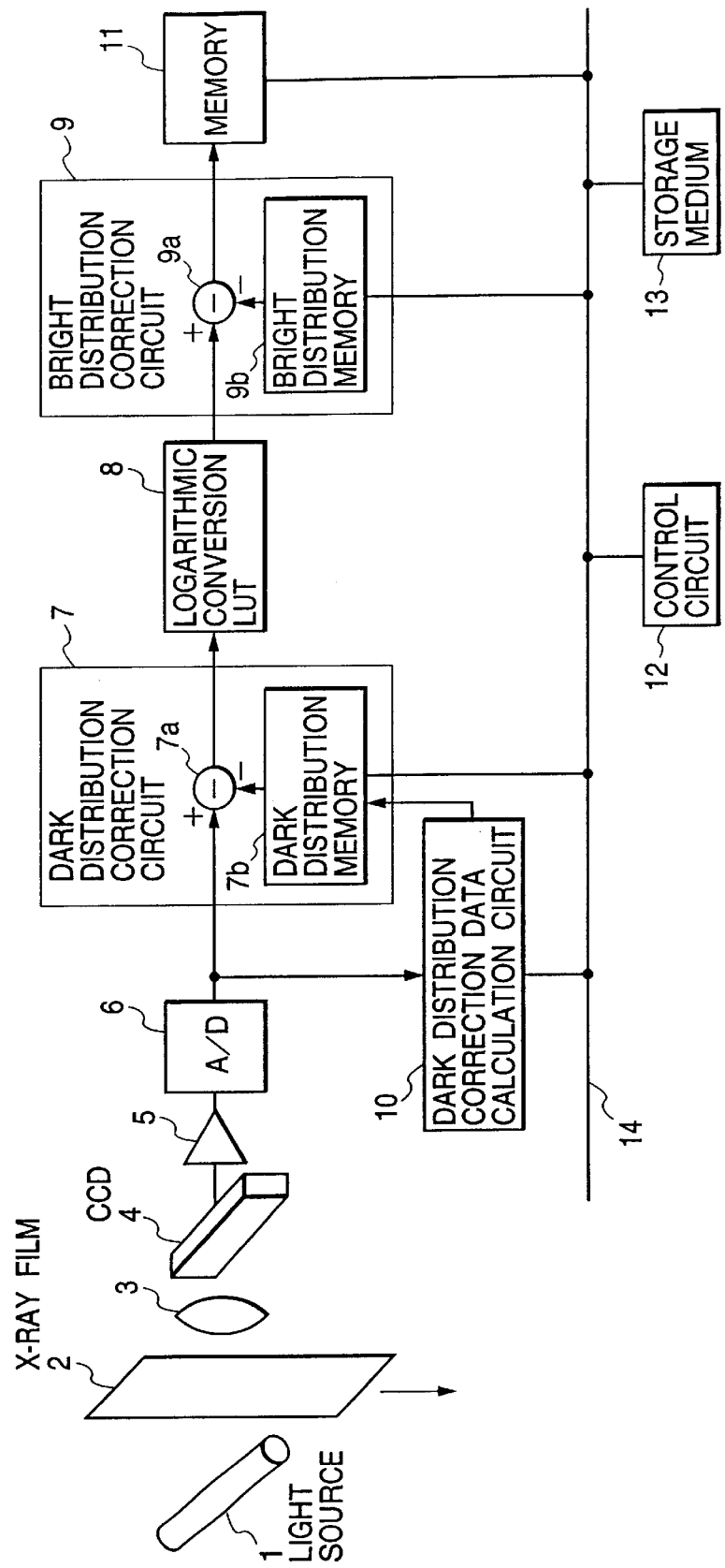
FIG. 1 is a block diagram showing the structure of an image reading apparatus according to the invention.

FIG. 1 is a block diagram showing the structure of a shading correction circuit of an X-ray film image reading apparatus according to the first embodiment of the invention.

Figure 4:
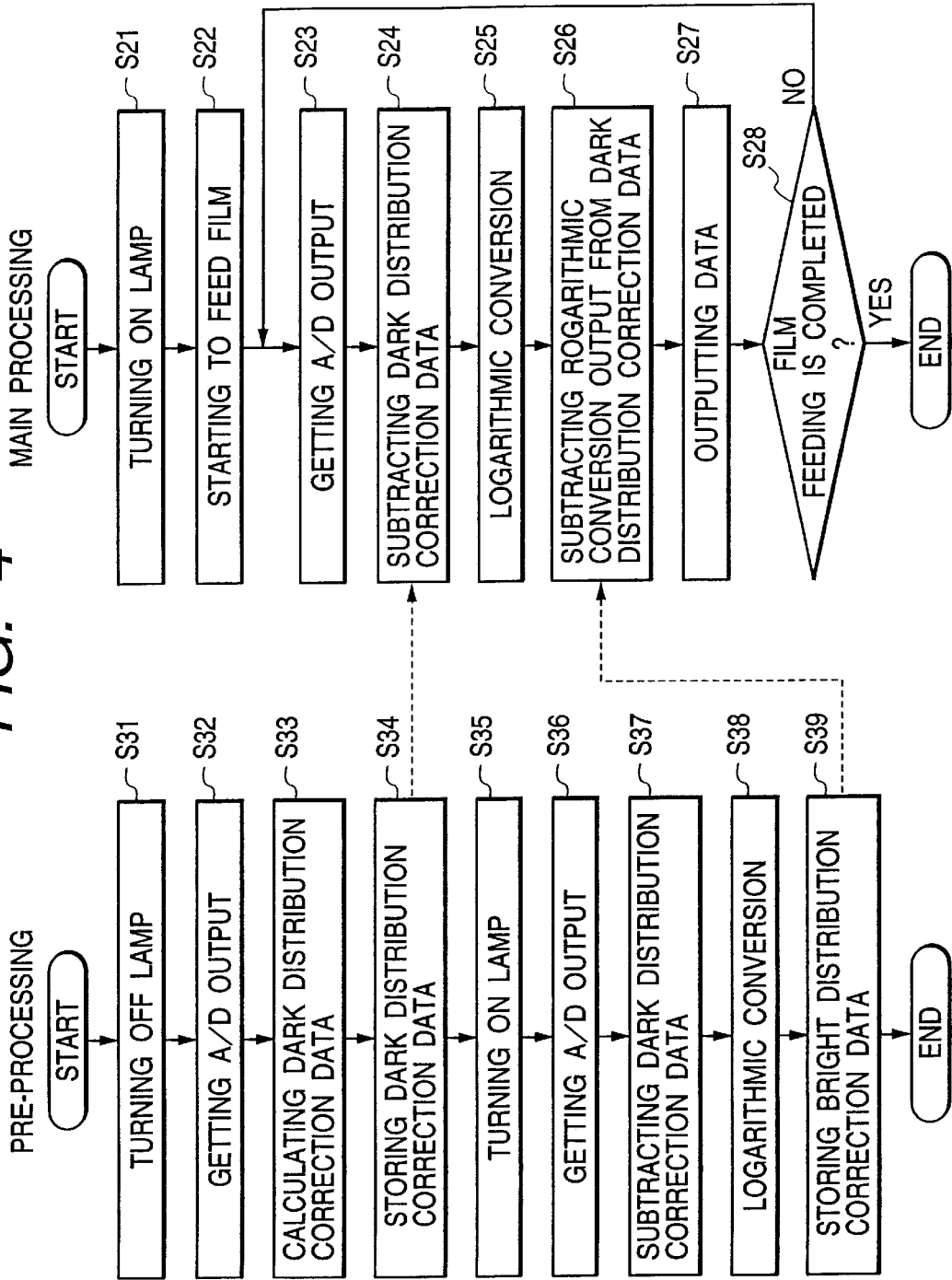
FIG. 4 is a flow chart illustrating the processes to be executed by the first and second embodiments.

Referring to the block diagram of FIG. 1, the X-ray film image reading apparatus has: a light source 1 such as a fluorescent lamp and a halogen lamp; an X-ray film 2 from which an image is read; an optical system lens 3, a CCD line sensor 4; an amplifier 5 for amplifying an output of the CCD line sensor; an A/D converter 5, a dark distribution correction circuit 7; a logarithm conversion look-up table 8; a bright distribution correction circuit 9; a dark distribution correction data calculation circuit 10; a memory 11 for storing shading corrected data; a control circuit 12 having a CPU and the like; a storage medium 13 which also constitutes the invention and may be a RAM, a ROM, an HD or the like storing programs and the like which execute the processes shown in FIG. 4 for running the X-ray film image reading apparatus; and a bus line 14 for transfer address, data, control signal and the like in this apparatus.

The dark distribution correction circuit 7 is constituted of a subtractor 7a and a dark distribution memory 7b having a capacity corresponding to the number of lines of the CCD line sensor 4. The bright distribution correction circuit 9 is constituted of a subtractor 9a and a bright distribution memory 9b having a capacity corresponding to the number of lines of the CCD line sensor 4.

An output of the CCD line sensor 4 is supplied via the amplifier 5 to the A/D converter 6, and an output of the AAD converter 6 is supplied to the dark distribution correction circuit 7 and dark distribution correction data calculation circuit 10. An output of the dark distribution correction data calculation circuit 10 is supplied to the dark distribution memory 7b of the dark distribution correction circuit 7, an output of the dark distribution correction circuit 7 is supplied via the logarithm conversion look-up table 8 to the bright distribution correction circuit 9, and an output of the bright distribution correction circuit 9 is stored in the memory 11.

Connected via the bus line 14 of this apparatus to the control circuit 12 are the dark distribution correction calculation circuit 10, dark distribution memory 7b of the dark distribution correction circuit, memory 11 and storage medium 13.

Next, the operation of the apparatus will be described.

A shading correction process to be described hereinunder includes a pre-processing and a main processing. In the pre-processing, correction data is collected, calculated, and stored in the memory. In the main processing, a subject X-ray film is read and corrected in accordance with the data stored during the pre-processing.

FIG. 4 is a flow chart illustrating the shading correction process.

The pre-processing includes Steps S31 to S39 shown in FIG. 4, and the main processing includes Steps S21 to S28.

At Step S31, an unrepresented turn-on control circuit turns off the light source 1.

At Step S32, A/D converted output data of the CCD line sensor 4 is acquired.

At Step S33, in accordance with the data acquired at Step S32, dark distribution correction data such as an average value, a mode value and a value obtained through spatial low-pass filtering is calculated.

At Step S34, the calculation result at Step S33 is stored as dark distribution correction data.

At Step S35, the unrepresented turn-on control circuit turns on the light source 1.

At Step S36, A/D converted output data of the CCD line sensor 4 is acquired.

At Step S37, the data stored at Step S34 is subtracted from the data acquired at Step S36.

At Step S38, the data obtained at Step S37 is logarithmically converted.

At Step S39, the data logarithmically converted at Step S38 is stored as bright distribution correction data.

The pre-processing is thus completed.

At Step S21, the light source 1 is turned-on by a turn-on control circuit (not shown).

At Step S22, transport of an X-ray film is stared by transport means (not shown).

At Step S23, A/D converted output data of the CCD line sensor 4 is acquired.

At Step S24, the data stored at Step S34 is subtracted from the data acquired at Step S23.

At Step S25, the data acquired at Step S24 is logarithmically converted.

At Step S26, the data logarithmically converted at Step S25 is subtracted from the data stored at Step S39.

At Step S27, the data acquired at Step S26 is stored.

At Step S28 it is judged whether the film transport is completed, and if not, Steps S23 to S27 are repeated until the film transport is completed, to thereby obtain one image.

With the above operations, an X-ray film image can be obtained.

First, the pre-processing performed before an X-ray film is read will be described in some detail.

First, the turn-on control circuit (not shown) turns off the light source 1. Since the light source 1 is turned off, the CCD line sensor 4 outputs a dark voltage. The dark voltage output from the CCD line sensor 4 is amplified by the amplifier 5. Noises in the dark voltage of the CCD line sensor 4 are reduced by a noise reduction circuit (CDS, not shown) and thereafter, an output of the noise reduction circuit is supplied to the A/D converter 6. The dark voltage is converted by the A/D converter 6 into n-bit digital data $B_i$ ($1 \leq i \leq p$, p is the number of pixels of one line) and supplied to the dark distribution correction circuit 7 and dark distribution correction data calculation circuit 10.

Figure 2:
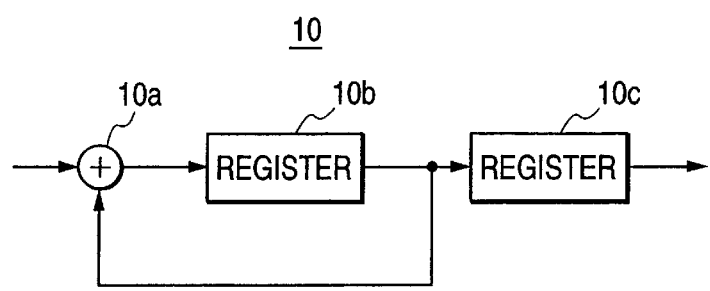
FIG. 2 is a block diagram showing the structure of a dark distribution correction data calculation circuit according to a first embodiment of the invention.

FIG. 2 is a block diagram showing the structure of the dark distribution correction data calculation circuit 10. The dark distribution correction data calculation circuit 10 has an adder 10a, a register 10b for storing an addition result, and a bit shifter 10c for dividing an output of the register 10b.

Next, the operation of the dark distribution correction data calculation circuit 10 will be described.

The register 10b for storing an addition result is reset by the control circuit 12 immediately before dark distribution data is collected. The adder 10a adds an output of the register 10b to the dark distribution voltage of the first pixel of the CCD line sensor 4 converted into a digital value by the A/D converter 6, the addition result being stored in the register 10b. The addition result stored in the register 10b is fed back and added to the next output of the A/D converter 6, the addition result being again stored in the register 10b.

This operation is repeated by $2^k$ times and thereafter, the output of the register 10b is shifted by k bits by the bit shifter 10c. Namely, the dark distribution correction calculation circuit 10 executes a calculation given by the following equation (1):

$$B = (1/2^k)\sum_{i=1}^{2^k} B_i \quad (1)$$

where $2^k \leq p$ (p: the number of pixels of one line). The dark distribution correction data B is calculated in the above manner.

The dark distribution correction data B may use line data which is acquired under the conditions that the dark distribution correction data is 0, that the logarithm conversion look-up table 8 is linear, and that the bright distribution correction calculation is not performed, and is averaged by the control circuit 12 over a plurality of pixels in one line, e.g., 2 to 500 pixels. In this case, data is not necessary to be collected from a plurality of lines.

More specifically, the dark distribution correction data B is calculated by the following equation (2):

$$B = (1/N)\sum_{i=1}^{N} B_i \quad (2)$$

where $2 \leq N \leq p$ (N: the number of calculation points for calculating the average value). Although the calculation point starts from the first pixel, the above calculation may be executed by using N pixels around the center pixel of the CCD line sensor.

Although the average value is used for the dark distribution correction data, the correction data is not limited only to the average value. For example, if the distribution of noises is not symmetrical, the average value may not represent the real dark distribution level. In such a case, not the average value but a mode value of distribution is used.

If the dark output is limited to 0 level, the mode value may take 0 level in some case. In this case, the mode value different from 0 level may be used.

The dark distribution correction data B calculated as above is stored in the dark distribution memory 7b as the correction data $B_i' = B$ ($1 = i \leq p$) for the i-th pixel.

The same value is subtracted from each pixel. Therefore, the dark distribution memory 7b is structured not as a one-line memory but as a one-pixel register, and the dark distribution correction circuit 7 may be structured to always subtract each pixel value by a value in the one-pixel register.

Next, the turn-on control circuit (not shown) turns on the light source 1 without setting the X-ray film 2. Since the light source 1 is turned on, the CCD line sensor 4 outputs a bright distribution voltage. The bright distribution voltage output from the CCD line sensor 4 is amplified by the amplifier 5. Noises in the bright distribution voltage of the CCD line sensor 4 are reduced by the noise reduction circuit (CDS, not shown) and thereafter, an output of the noise reduction circuit is supplied to the A/D converter 6. This voltage is converted by the A/D converter 6 into n-bit digital data $L_i$ ($1 \leq i \leq p$, p is the number of pixels of one line).

The dark distribution correction circuit 7 performs dark distribution correction by using the stored dark distribution correction data $B_i'$ and outputs $L_i - B_i'$ ($1 \leq i \leq p$). This output is supplied to the logarithm look-up table 8 of an n-bit input—to-n-bit output type. By acquiring the output of the logarithm look-up table 8 without bright distribution correction calculation, bright distribution correction data $L_i'$ subjected to the dark distribution correction and logarithmic conversion can be obtained as:

$$L_i' = [A \cdot \log_{10}(L_i - B_i' + 1)] \quad (3)$$

where $1 \leq i \leq p$ and $A = (2^n - 1)/\log_{10}(2^n)$. This bright distribution correction data $L_i'$ is stored in the bright distribution memory 9b.

The pre-processing is completed by the above processes.

Next, the main processing of reading an X-ray film will be described.

The turn-on control circuit (not shown) turns on the light source 1. Light from the light source 1 is transmitted through the X-ray film 2, converged by the optical lens 3, and focussed upon the CCD line sensor 4.

The X-ray film 2 is sequentially transported in a direction indicated by an arrow by transport means (not shown). The CCD line sensor 4 receives a one-dimensional image perpendicular to the transport direction so that the X-ray film 2 is scanned by the CCD line sensor 4 and all pixel data are read.

Light received by the CCD line sensor 4 is photoelectrically converted and output as a voltage value of each pixel. This output is amplified by the amplifier 5. Noises of the output signal are reduced by the noise reduction circuit (not shown) and thereafter, the output of the noise reduction circuit is supplied to the A/D converter 6 which converts it into n-bit digital data $D_i$ ($1 \leq i \leq p$, p is the number of pixels of one line).

The subtractor 7a of the dark distribution correction circuit 7 subtracts the dark distribution correction data $B_i'$ calculated by the pre-processing from the output data of each pixel of the CCD line sensor. An output of the dark distribution correction circuit 7 is given by:

$$D_i' = D_i - B_i' \ (1 \leq i \leq p).$$

This output is supplied to the logarithm conversion look-up table 8 for division calculation. An output of the logarithm conversion look-up table 8 of the n-bit input—to-n-bit output type is given by:

$$Y_i = [A \cdot \log_{10}(D' + 1)]$$

where $1 \leq i \leq p$ and $A = (2^n - 1)/\log_{10}(2^n)$

The subtractor 9a of the bright distribution correction circuit 9 subtracts the output $Y_i$ of the logarithm conversion look-up table 8 from the output data of each pixel or bright distribution correction data $L_i$ collected at the pre-processing. This subtraction by the subtractor 9a corresponds to division which readily calculates a transmission factor of the X-ray film. This logarithmic output of the subtractor 9a is a density value $Z_i$ given by:

$$Z_i = L_i' - Y_i (1 \leq i \leq p)$$

The density value $Z_i$ is stored in the memory 11.

The shading correction process is performed in the above manner while an X-ray film is read. In this embodiment, although a line sensor is used, an area sensor may also be used by performing similar processes described above, if a variation in the dark output distribution is small.

With this embodiment, an average value of dark output distribution data is calculated to obtain the black correction data. It is possible to prevent artifacts from being generated by random noises superposed upon the black correction data, and to simplify circuits.

This embodiment assumes that variation in fixed pattern noises to be caused by dark current fluctuation or the like is negligibly small. If a pixel has a random noise level such that absolute value of difference between that random noise level and a reference random noise level does not enter a range predetermined by the random noise characteristics anticipated from the physical characteristics of a solid state image pickup device and its peripheral circuit or by the random noise characteristics actually measured, then the black correction of such the pixel may be performed by using the dark output value of that pixel in place of the reference random noise level.

More specifically, it is assumed that the reference random noise level is B and the random noise characteristics anticipated from the physical characteristics of a solid state image pickup device and its peripheral circuit or random noise characteristics actually measured are represented by a standard deviation aN In this case, if a pixel has a random noise level not entering the range of $B+/-k\sigma_N$, then the black correction for this pixel is performed by using the dark output value $B_i$ of this pixel in place of the reference random noise value B.

Next, the second embodiment of the invention will be described.

A CCD line sensor is generally fixedly mounted on an optical system. Since a heat dissipation efficiency at the contact portion between the fixedly mounted portion of the CCD line sensor and the optical system is different from that at the other portions, a temperature distribution of the CCD line sensor becomes uneven. Since a variation in the dark current depends on temperature, the fixed value for dark distribution correction described above may not correct the dark current over the whole area of the CCD line sensor.

A change in the dark output distribution, caused by the uneven temperature distribution, is generally gentle relative a CCD line sensor. Therefore, in order to correct a change in the dark output distribution, collected fixed pattern noises are subjected to a spatial low-pass filtering process to remove and correct random noises.

In the second embodiment, a shading correction circuit capable of correcting a variation in the temperature distribution will be described.

Figure 3:
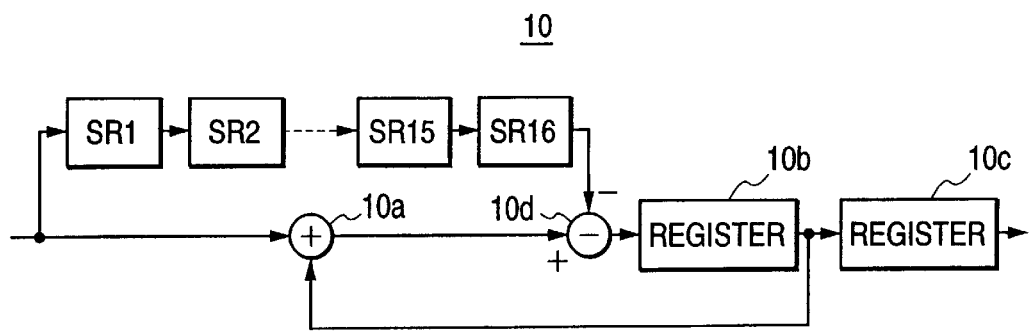
FIG. 3 is a block diagram showing the structure of a dark distribution correction data calculation circuit according to a second embodiment of the invention.

The structure of the second embodiment is similar to that shown in FIG. 1, except that a dark distribution correction data calculation circuit 10 takes the structure shown in FIG. 3.

First, the pre-processing to be performed before an X-ray film is read will be described.

First, the turn-on control circuit (not shown) turns off the light source 1. Since the light source 1 is turned off, the CCD line sensor 4 outputs a dark distribution output voltage. The dark voltage output voltage from the CCD line sensor 4 is amplified by the amplifier 5. Noises in the dark voltage of the CCD line sensor 4 are reduced by the noise reduction circuit (CDS, not shown) and thereafter, an output of the noise reduction circuit is supplied to the A/D converter 6. The dark voltage is converted by the A/D converter 6 into n-bit digital data $B_i$ ($1 \leq i \leq p$, p is the number of pixels of one line).

FIG. 3 is a block diagram showing the structure of the dark distribution correction data calculation circuit 10.

The dark distribution correction data calculation circuit 10 has an adder 10a, a register 10b for storing an addition result, a bit shifter 10c for dividing an output of the register lob, a subtractor 10d, and sixteen shift registers SR1, SR2, . . . , SR16.

Next, the operation of the dark distribution correction data calculation circuit 10 will be described.

The register 10b for storing an addition result and the shift registers SR1, SR2, . . . , SR16 are reset by the control circuit 12 immediately before dark distribution data is collected. Outputs from the CCD line sensor 4 converted into digital values by the A/D converter 6 are sequentially input to the register, starting from the first pixel. The adder 10a adds an output of the register 10b to the dark distribution voltage of the first pixel of the CCD line sensor 4 converted into the digital value by the A/D converter 6. The subtractor 10d subtracts the output of the shift register SR16 from an output of the adder 10a, the subtraction result being stored in the register 10b. The subtraction result stored in the register 10b is fed back and added to the next output of the A/D converter 6, and subtracted by an output of the shift register SR16, the subtraction result being again stored in the register 10b.

This operation is repeated by 16 times and thereafter, the output of the register 10b is shifted by four bits by the bit shifter 10c. Correction data $B_i'$ for the first pixel is therefore stored in the dark correction memory 7b.

The above operations are repeated to sequentially store the correction data of each pixel in the dark distribution correction memory 7b. Namely, the dark distribution correction calculation circuit 10 executes a calculation given by the following equation (4):

$$B_i' = (1/16)\sum_{j=1}^{16} D_{i+j} \qquad (4)$$

where $1 \leq i \leq p-16$. The dark distribution moving average output $B_i'$ is stored in the memory 7b. Although sixteen shift registers are used, the number of shift registers may be increased to 32, 64, . . . , with the number of bits to be shifted by the shift register 10c being changed correspondingly, to thereby suppress the influence of random noises. Alternatively, the number of shift registers may be decreased to simplify the circuit structure.

The dark distribution correction data $B_i'$ may use line data which is acquired under the conditions that the dark distribution correction data is 0, that the logarithm conversion look-up table 8 is linear, and that the bright distribution correction calculation is not performed, and is subjected to a moving averaging process given by the following equation (5) by the control circuit. In this case, data is not necessary to be collected from a plurality of lines. The dark distribution correction data $B_i'$ is given by:

$$B_i' = (1/m)\sum_{j=1}^{m} D_{i+j} \qquad (5)$$

where m is the number of moving averaging points. Although the moving averaging process is used as the spatial low-pass filtering, other processes may also be used which allow the spatial low-pass filtering.

The bright distribution data collection process and the main processing of the second embodiment are similar to those of the first embodiment.

In the second embodiment, the collected dark output distribution data subjected to the spatial low-pass filtering is used as the dark distribution correction data. Therefore, without collecting dark distribution data of a plurality of lines, artifacts to be caused by random noises superposed upon the dark distribution correction data can be prevented from being generated, and a change in the dark output distribution data, caused by an uneven temperature distribution, can be corrected.

The present invention can be achieved also by supplying another system or apparatus with the storage medium 13 storing program codes achieving the function of the invention, and by making a computer of the system or apparatus read and execute the program codes stored in the storage medium 13.

As described above, according to the embodiments of the invention, it is possible to prevent artifacts from being generated by random noises superposed upon the fixed pattern noise correction data, and to simplify circuits.

Instead of the correction data, a dark output distribution value of a pixel having a particular random noise level may be used for data subtraction. Accordingly, it is possible to effectively correct a variation in fixed pattern noises such as dark current fluctuation of a CCD line sensor.

Collected dark output distribution data subjected to spatial low-pass filtering may be used as the correction data. Accordingly, without collecting dark distribution data of a plurality of lines, artifacts to be caused by random noises superposed upon the dark distribution correction data can be prevented from being generated, and a change in the dark output distribution, caused by an uneven temperature distribution, can be corrected.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   image pickup means for optically reading an image and converting the read image into an electrical image signal;
   calculating means for calculating correction data in accordance with dark output distribution data obtained by said image pickup means; and
   subtracting means for subtracting the correction data from the image signal obtained by said image pickup means by reading the image,
   wherein said calculating means calculates a statistical mode value of the dark output distribution data of all or some pixels and uses the mode value as the correction data.

2. An image reading apparatus comprising:
   image pickup means for optically reading an image and converting the read image into an electrical image signal;
   calculating means for calculating correction data in accordance with dark output distribution data obtained by said image pickup means; and
   subtracting means for subtracting the correction data from the image signal obtained by said image pickup means by reading the image,
   wherein said calculating means calculates, if the dark output distribution data is limited to a predetermined level, a mode value having a level different from the predetermined level.

3. An image reading apparatus comprising:
   image pickup means for optically reading an image and converting the read image into an electrical image signal;
   calculating means for calculating correction data in accordance with dark output distribution data obtained by said image pickup means; and
   subtracting means for subtracting the correction data from the image signal obtained by said image pickup means by reading the image,
   wherein said subtracting means does not subtract the correction data from the image signal for a specific pixel, but subtracts a pixel value of the specific pixel from the image signal.

4. An image reading apparatus according to claim 3, wherein the specific pixel is a pixel having a random noise level such that an absolute value of an output of said subtracting means does not enter a range relative predetermined by the random noises anticipated from the physical characteristics of said image pickup means and peripheral circuits or by adding a standard deviation multiplied by k (k being an integer) of the random noises actually measured.

5. An image reading apparatus comprising:
   image pickup means for optically reading an image and converting the read image into an electrical image signal;
   calculating means for calculating correction data in accordance with dark output distribution data obtained by said image pickup means; and
   subtracting means for subtracting the correction data from the image signal obtained by said image pickup means by reading the image,
   wherein said calculating means uses the dark output distribution data subjected to a spatial low-pass filtering process as the correction data.

6. An image reading apparatus according to claim 5, wherein the spatial low-pass filtering process is a moving averaging process.

7. A computer readable storage medium storing a program, said program comprising:
   code for optically reading an image with image pickup means and converting the read image into an electrical image signal;
   code for calculating correction data in accordance with dark output distribution data obtained by the image pickup means; and
   code for subtracting the correction data from the image signal obtained by the image pickup means by reading the image,
   wherein said calculating step includes calculating a statistical mode value of the dark output distribution data of all or some pixels and uses the mode value as the correction data.

8. A computer readable storage medium storing a program, said program comprising:
   code for optically reading an image with an image pickup means and converting the read image into an electrical image signal;
   code for calculating correction data in accordance with dark output distribution data obtained by the image pickup means; and
   code for subtracting the correction data from the image signal obtained by the image pickup means by reading the image,
   wherein said calculating step includes calculating, if the dark output distribution data is limited to a predetermined level, a mode value having a level different from the predetermined level.

9. A computer readable storage medium storing a program, said program comprising:
   code for optically reading an image with an image pickup means and converting the read image into an electrical image signal;
   code for calculating correction data in accordance with dark output distribution data obtained by the image pickup means; and
   code for subtracting the correction data from the image signal obtained by the image pickup means by reading the image,
   wherein in said subtracting step, the correction data is not subtracted from the image signal for a specific pixel, but a pixel value of the specific pixel is subtracted from the image signal.

10. A computer readable storage medium storing a program according to claim 9, wherein the specific pixel is a pixel having a random noise level such that an absolute value of an output of said subtracting step does not enter a range predetermined by the random noises anticipated from the physical characteristics of the image pickup means and peripheral circuits or by adding a standard deviation multiplied by k (k being an integer) of the random noises actually measured.

11. A computer readable storage medium storing a program, said program comprising:

code for optically reading an image with an image pickup means and converting the read image into an electrical image signal;

code for calculating correction data in accordance with dark output distribution data obtained by the image pickup means; and code for subtracting the correction data from the image signal obtained by the image pickup means by reading the image, wherein said calculating step includes calculating, uses output distribution data subjected to a spatial low-pass filtering process as the correction data.

12. A computer readable storage medium storing a program according to claim 11, wherein the spatial low-pass filtering process is a moving averaging process.

* * * * *

UNITED STATES PATENT AND TRADEMARK OFFICE
CERTIFICATE OF CORRECTION

| | |
|---|---|
| PATENT NO. | : 7,196,725 B1 |
| APPLICATION NO. | : 09/309872 |
| DATED | : March 27, 2007 |
| INVENTOR(S) | : Akio Saigusa et al. |

It is certified that error appears in the above-identified patent and that said Letters Patent is hereby corrected as shown below:

TITLE PAGE, ITEM [54] TITLE

"IMAGE READING APPARATUS AND COMPUTER READABLE STORAGE MEDIUM" should read --IMAGE READING APPARATUS AND COMPUTER READABLE STORAGE MEDIUM FOR CORRECTING IMAGE SIGNALS--.

SHEET 3

Figure 4, "ROGARITHMIC" should read --LOGARITHMIC--.

COLUMN 1

Line 1, "IMAGE READING APPARATUS AND COMPUTER READABLE STORAGE MEDIUM" should read --IMAGE READING APPARATUS AND COMPUTER READABLE STORAGE MEDIUM FOR CORRECTING IMAGE SIGNALS--.
Line 36, "which" should read --which are--.
Line 43, "know" should read --known--.

COLUMN 2

Line 2, "to.thereby" should read --to thereby--.

COLUMN 3

Line 24, "AAD" should read --A/D--.

COLUMN 4

Line 25, "Step S28" should read --Step S28,--.

UNITED STATES PATENT AND TRADEMARK OFFICE
CERTIFICATE OF CORRECTION

PATENT NO.       : 7,196,725 B1
APPLICATION NO.  : 09/309872
DATED            : March 27, 2007
INVENTOR(S)      : Akio Saigusa et al.

It is certified that error appears in the above-identified patent and that said Letters Patent is hereby corrected as shown below:

COLUMN 5

Line 8, "(1)" should be deleted.
    Line 39, "case." should read --cases.--.
    Line 43, "(1=i≤p)" should read --(1≤i≤p)--.

COLUMN 7

Line 15, "deviation aN" should read --deviation $\sigma_N$--.
    Line 62, "lob," should read --10b,--.

COLUMN 8

Line 13, "by" should be deleted.

Signed and Sealed this

Second Day of December, 2008

JON W. DUDAS
*Director of the United States Patent and Trademark Office*